March 18, 1941.  B. A. DIGGINS ET AL  2,235,314
LIQUID LEVEL
Filed April 12, 1939
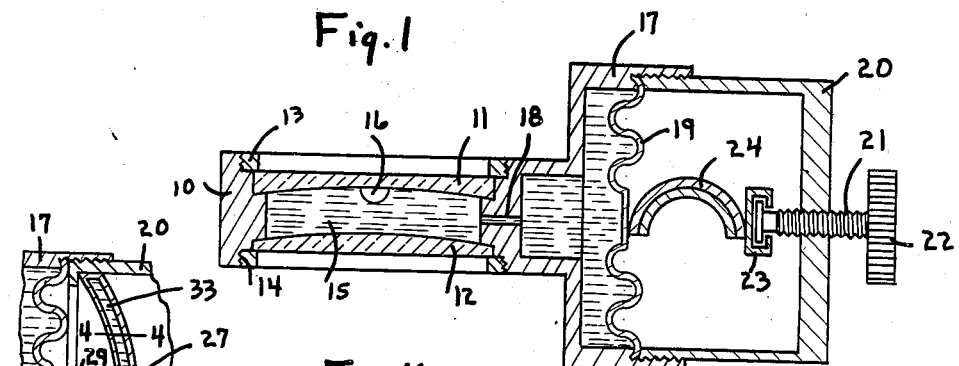
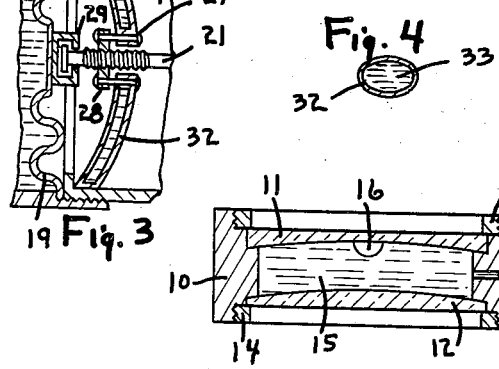
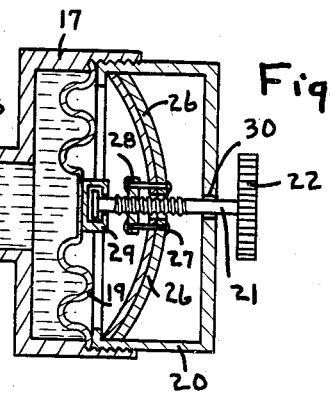
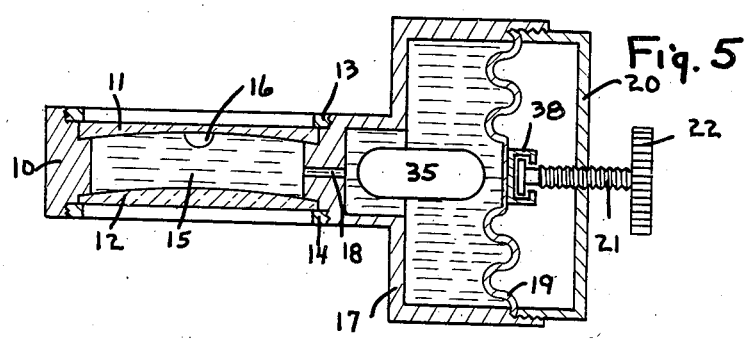
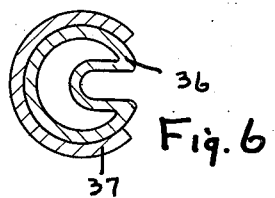
BARTHOLOMEW A. DIGGINS
GEORGE B. GALLASCH
INVENTORS
BY
ATTORNEY Patented Mar. 18, 1941

2,235,314

UNITED STATES PATENT OFFICE 2,235,314

LIQUID LEVEL

Bartholomew A. Diggins and George B. Gallasch, Rochester, N. Y., assignors to Bausch & Lomb Optical Company, Rochester, N. Y., a corporation of New York Application April 12, 1939, Serial No. 267,492

3 Claims. (Cl. 33—212)

The present invention relates to liquid levels and more particularly to adjusting and compensating means for such levels. This application is a continuation in part of our copending application Serial No. 28,686 filed June 27, 1935, for Liquid level.

One of the objects of the present invention is to provide a liquid level in which the bubble can be adjusted and maintained at any desired size. Another object is to provide a bubble level having a compensation chamber with a manual adjustment for obtaining a bubble of the desired size and thermo-responsive means for maintaining the bubble at that size irrespective of temperature changes. A further object is to provide a bubble level having a single auxiliary chamber with independent manual and automatic means for varying the volume of the chamber. These and other objects and advantages reside in certain novel features of construction, arrangement and combination of parts as will hereinafter be more fully set forth and pointed out in the appended claims.

Referring to the drawing:

Fig. 1 is a sectional view of a liquid level embodying this invention.

Fig. 2 is a vertical section of a modification.

Fig. 3 is a fragmentary section of an alternative actuating mechanism.

Fig. 4 is a section taken on line 4—4 of Fig. 3.

Fig. 5 is a vertical section of another modification of this invention.

Fig. 6 is a section of one form of compensation device used in the modification shown in Fig. 5.

In the embodiment shown in Fig. 1, 10 designates a bubble chamber which is closed at the ends by lenses 11 and 12. These lenses 11 and 12 are secured in position by lock rings 13 and 14, respectively, and enclose a fluid 15 within which is a bubble 16. A compensation chamber 17 is formed integrally with or attached to the bubble chamber 10 and a passageway or conduit 18 connects the two chambers. One wall 19 of the chamber 17 is flexible and is fastened in place by some suitable means such as the cap 20 threaded on the side walls of the chamber 17.

A manual adjusting screw 21 is threaded in the cap 20 and is formed with an enlarged knob 22 at its outer end. The inner end of the screw 21 is freely rotatable but held against relative longitudinal movement in a bracket 23 and a thermo-responsive element 24 is fixed at one end to the bracket 23 and at the other to the flexible wall 19 of the chamber 17.

This thermo-responsive element 24 is illustrated as a curved, bimetallic strip giving a relatively large movement for a relatively small change in temperature. This strip 24 decreases its radius of curvature for an increase in temperature and increases its radius of curvature for a temperature drop. The extent of this movement depends on the coefficient of expansion of the liquid, the volume of the liquid and the size of the wall 19 and can be readily determined.

The desired size of the bubble 16 is obtained by actuating the screw 21 and this size is maintained by balancing the movement of the strip 24 and wall 19 against the expansion of the liquid.

In the modification shown in Fig. 2, heat responsive elements 26 are secured at their outer ends to the wall of the cap 20. The inner end of each element 26 carries a freely pivoted link 27 and each link 27 is pivotally secured to a nut 28. The screw 21 is threaded in this nut 28 and is rotatable in a bracket 29 attached to the flexible wall or diaphragm 19. The screw 21 passes through an enlarged hole 30 in the cap 20 and rotation of the screw 21 moves the diaphragm 19 to vary the size of the bubble 16. The heat responsive elements 26 maintain the bubble 16 at this selected size by moving the screw 21 longitudinally.

The heat responsive elements may be bimetallic strips 26 as shown in Fig. 2 or they may take the form of Bourdon tubes 32 as shown in Figs. 3 and 4. In this latter modification, the thermo-responsive elements consist of curved, elliptical or flattened tubes 32 of flexible material. These tubes 32 are filled with a fluid 33 and sealed at both ends. Upon an increase of temperature, the fluid 33 expands, the pressure increases and the tubes 32 straighten out. The connections for these tubes 32 may be identical with those for the elements 26 in Fig. 2.

Figs. 5 and 6 illustrate a modification in which an air chamber 35 of variable volume is inserted in the fluid within the chamber 17. This air chamber 35 may consist of a laterally curved or crimped tube or capsule 36 formed of flexible metal of one coefficient of expansion and provided with a jacket 37 of metal of a different coefficient of expansion. The volume of this chamber 35 decreases with an increase of temperature and increases with a decrease of temperature balancing the volume changes of the fluid 15. In this modification, the screw 21 is threaded in the cap 20 and operates the diaphragm 19 directly through the bracket 38.

From the foregoing, it will be apparent that we are able to attain the objects of our invention and provide a liquid level in which the bubble size may be readily adjusted and will be automatically maintained irrespective of temperature changes. Various modifications can, of course, be made without departing from the spirit of our invention or the scope of the appended claims.

We claim:

1. A liquid level comprising a bubble chamber, a second chamber in communication therewith, a liquid in said chambers, a movable member forming one wall of the second chamber, a heat responsive element, a screw secured to said heat responsive element and to the movable member whereby said element will move said wall with changes in temperature, and means for turning the screw to move said movable member independently of said element.

2. A liquid level comprising a bubble chamber, a second chamber in communication therewith, a liquid in said chambers, a movable member forming one wall of the second chamber, a heat responsive element formed of a bimetallic strip, a screw secured to said heat responsive element and to the movable member whereby said element will move said wall with changes in temperature, and means for turning the screw to move said movable member independently of said element.

3. A liquid level comprising a bubble chamber, a second chamber in communication therewith, a liquid in said chambers, a movable member forming an end wall for said second chamber, a cap member mounted on said second chamber adjacent to and over said movable member, a heat responsive element mounted within said cap member and having its ends fixedly secured thereto, said cap member and said heat responsive element being provided with aligned openings, a bracket secured upon said movable member on the side thereof adjacent said cap member and in alignment with said openings, a screw extending through said openings, an operating knob on the end of said screw extending exteriorly of said cap member, means connecting and rotatably supporting the other end of said screw within said bracket, a nut on said screw and means connecting said nut to said heat responsive element and for substantially preventing movement of the nut upon rotation of the screw comprising link members pivotally secured to the nut and to the heat responsive member.

BARTHOLOMEW A. DIGGINS.
GEORGE B. GALLASCH.